Figure 1:
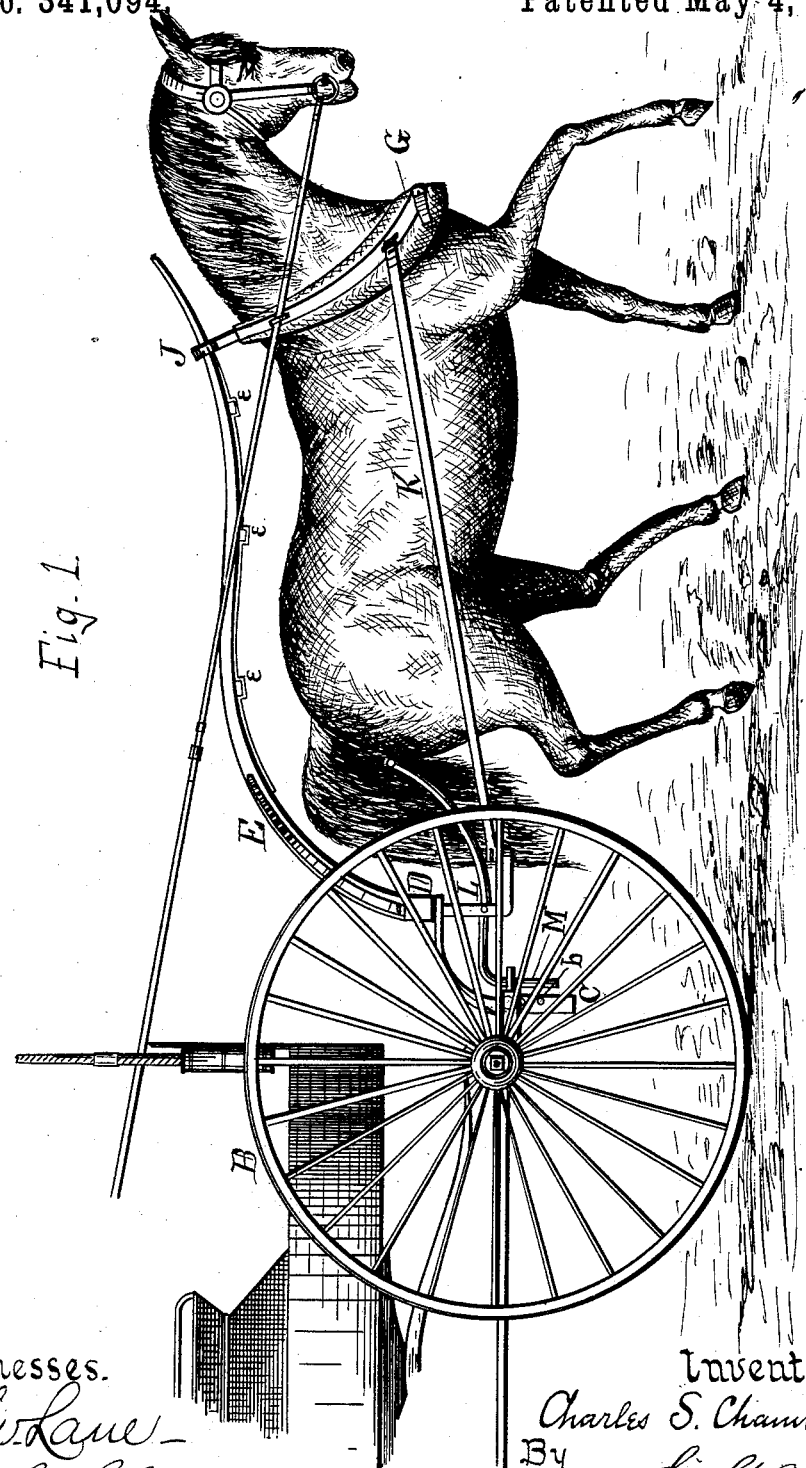

(No Model.) 2 Sheets—Sheet 1.

C. S. CHAMBERLAIN, Dec'd.
S. C. CHAMBERLAIN, Administratrix.
DRAFT MECHANISM FOR VEHICLES.

No. 341,094. Patented May 4, 1886.

Witnesses.
F. W. Lane
Arthur S. Browne

Inventor.
Charles S. Chamberlain,
By Soulé and Co
Attorneys.

(No Model.) 2 Sheets—Sheet 2.
C. S. CHAMBERLAIN, Dec'd.
S. C. CHAMBERLAIN, Administratrix.
DRAFT MECHANISM FOR VEHICLES.
No. 341,094. Patented May 4, 1886.
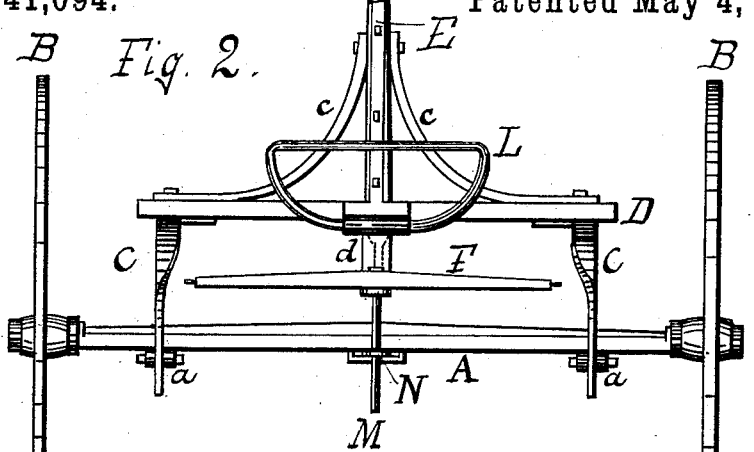
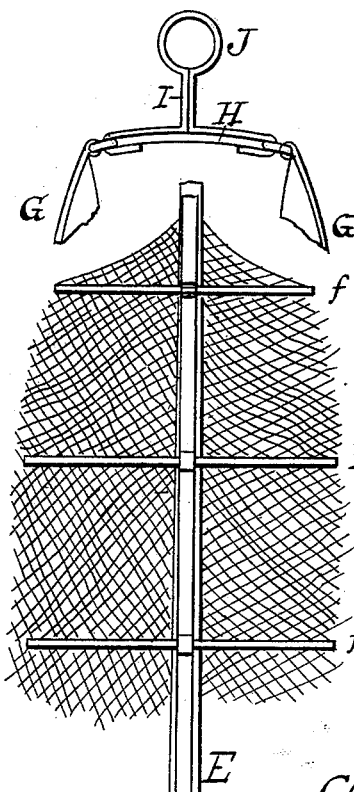
Witnesses.
F. W. Lane
Arthur H. Browne
Inventor.
Charles S. Chamberlain,
By Soule and Co.
Attorneys.

UNITED STATES PATENT OFFICE.

CHARLES S. CHAMBERLAIN, OF TREVORTON, PENNSYLVANIA; SABINA C. CHAMBERLAIN ADMINISTRATRIX OF SAID CHARLES S. CHAMBERLAIN, DECEASED.

DRAFT MECHANISM FOR VEHICLES.

SPECIFICATION forming part of Letters Patent No. 341,094, dated May 4, 1886.

Application filed October 9, 1885. Serial No. 179,395. (No model.)

*To all whom it may concern:*

Be it known that I, CHARLES S. CHAMBERLAIN, a citizen of the United States, residing at Trevorton, in the county of Northumberland and State of Pennsylvania, have invented certain new and useful Improvements in the Draft Mechanism for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to dispense with the draft-poles and shafts of vehicles and to simplify the hitching of the horse to the vehicle.

The invention consists, principally, in an upwardly-arched pole attached to the vehicle, which extends over the back of the horse without touching the horse. From this pole the hames are suspended, and the traces are connected to the hames and to a whiffletree mounted on the frame to which the pole is attached. The hames are not rigidly secured to the pole, but are simply suspended therefrom, and the entire draft of the vehicle is borne by the traces, the pole serving to turn the vehicle. A holdback is also provided, which consists of a light skeleton frame which is fastened to the pole-frame which rests against the back of the horse.

Other features are embraced in the invention, which will be hereinafter more specifically set forth.

These improvements are applicable to all kinds of vehicles, and are equally applicable whether one horse is used or two.

In the drawings I have shown the improvements as secured simply to a pair of wheels, which may be the front wheels of any kind of vehicle.

In these drawings, Figure 1 is a side view of a pair of vehicle-wheels provided with my improvements. Fig. 2 is a front view of the connection between the shaft and pole. Fig. 3 is a front view of the connection between the hames and pole, and Fig. 4 is a bottom view of the central portion of the pole.

Like letters designate corresponding parts in all of the figures.

A is the front axle, and B B are the front wheels, of a vehicle. To the forward side of the axle are secured two split eyes, $a\ a$, to which are bolted upwardly-extending metallic hounds C C. These hounds are provided with a series of bolt-holes, $b\ b$, so that they may be secured to the eyes $a\ a$ at any desired height to adapt them to any size of horse. These hounds are connected together by a cross draft-bar, D, and secured to the center of this bar is the upwardly-arched pole E, which extends upward over the back of the horse. This pole is braced laterally by pole-hounds $c\ c$, which are connected to the draft-bar D. The whiffletree F is pivoted to a bracket, $d$, depending from the center of the draft-bar.

The hames G G are connected together at the top by a metallic connecting-bar, H, to which they are pivoted. Secured to the center of this bar is a vertical arm, I, having a ring, J, at the upper end. This ring is passed over the free end of the pole E, and the hames are thus suspended from the pole. The hames are not otherwise connected to the pole, and are free to be moved back and forward along the pole, to be accommodated to different sizes of horses and the motion of the vehicle. The usual traces, K K, connect the hames with the whiffletree F.

By the described mechanism the hitching of a horse to the vehicle is a very easy matter. The hames are usually kept suspended from the pole with the traces attached to the whiffletree. When the collar has been put on the horse, he is harnessed by simply buckling the hames around the collar. Since the hames are free to be moved along the pole, it is clear that the pulling of the vehicle is entirely accomplished by the traces. The vehicle is turned by means of the pole and its connection with the hames. The length of the pole gives such an amount of leverage that but little strain is placed upon the hame-connection to turn the vehicle. In case the team is a double one, a cross-yoke would be attached to the pole and the hames suspended from the cross-yoke, as will be readily understood.

The holdback consists of a skeleton frame, L. This frame is connected to the draft-bar D beneath the pole and above the whiffletree. This frame is so located that it is immediately in the rear of the horse, and will bear against the back of the horse when the vehicle runs too rapidly or the horse backs. At the same time this prevents the pole from coming in contact with the horse in the rear, while the arched shape of the pole and its support by the hame-connection in part hold it out of contact with the horse throughout its entire length. The frame L is preferably hinged to the draft-bar, so as to oscillate within certain limits, and has a depending arm, M, secured thereto, which passes through an aperture in the link N, borne by the axle, for purposes which are set forth in an application for Letters Patent filed herewith by myself and Jeremiah Miller. The pole is preferably provided with eyes $e\,e$, which serve to support the cross-rods $f\,f$. These rods serve to support a fly-net or cover to protect the horse. By this means the horse may be protected from flies, the sun, or rain, by a covering which will not touch at any part of his body.

This invention, it will be seen, dispenses with the most expensive parts of the harness, those which are most liable to break, and those which produce the most friction upon and cause the most annoyance to the horse.

Another advantage is the adaptability of this draft mechanism to any of the well-known hitching devices.

The best of these devices are those which unfasten the traces from the whiffletree. With one of these devices applied to a vehicle provided with my improvements the horse can be easily unhitched if he starts to run away. The team being detached, the hames will slip easily off the pole, and thus entirely detach the vehicle from the horse.

I claim as my invention—

1. In a vehicle having no shaft or draft-pole, an upwardly-arched pole which extends over the back of the horse, substantially as set forth.

2. In a vehicle, an upwardly-arched pole which extends over the back of the horse, in combination with hames suspended therefrom, substantially as set forth.

3. In a vehicle, an upwardly-arched pole, in combination with hames provided with a ring situated at the top thereof, whereby it may be removably suspended from said pole, substantially as set forth.

4. In a vehicle, a draft-bar, a whiffletree attached thereto, and an upwardly-arched pole secured to said draft-bar, in combination with hames suspended from said pole, and traces connecting said hames and whiffletree, substantially as set forth.

5. A carriage-axle and eyes attached thereto, in combination with hounds provided with a series of bolt-holes, whereby they may be secured adjustably to said axle-eyes, and a draft-bar secured to said hounds, substantially as set forth.

6. In a vehicle having no shafts or draft-pole, an upwardly-arched pole which extends over the back of the horse, in combination with a holdback secured to the vehicle, said holdback consisting of a frame which is located beneath the arched pole and immediately behind the horse, substantially as and for the purpose set forth.

7. An upwardly-arched pole which extends over the back of the horse, in combination with a frame carried by said pole, which serves to hold a cover or net over the horse, substantially as set forth.

In testimony whereof I affix my signature in presence of two witnesses.

CHARLES S. CHAMBERLAIN.

Witnesses:
W. E. ZIMMERMAN,
GEO. W. JOHN.